United States Patent
Abramson et al.

(10) Patent No.: US 9,471,391 B1
(45) Date of Patent: Oct. 18, 2016

(54) AGGREGATING RESOURCE REQUESTS

(71) Applicant: Google Inc., Mountain View, CA (US)

(72) Inventors: Nelson L. Abramson, New York, NY (US); John Meyer Bossert, Mountain View, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 14/085,414

(22) Filed: Nov. 20, 2013

(51) Int. Cl.
G06F 9/50 (2006.01)

(52) U.S. Cl.
CPC ........... G06F 9/5072 (2013.01); G06F 9/5027 (2013.01)

(58) Field of Classification Search
CPC ............... H04L 5/0035; H04L 41/042; H04L 29/08153; G06F 9/46; G06F 9/5072; G06F 50/27
See application file for complete search history.

(56) References Cited

U.S. PATENT DOCUMENTS

| | | | | |
|---|---|---|---|---|
| 7,290,009 B1 * | 10/2007 | Semret | ................... | G06Q 10/02 |
| 7,970,903 B2 * | 6/2011 | Oeda | ..................... | G06F 9/4856 709/226 |
| 8,135,610 B1 * | 3/2012 | Bryce | ............. | G06Q 10/06395 705/7.41 |
| 8,291,424 B2 * | 10/2012 | McLean | ................... | G06F 9/50 718/1 |
| 8,352,611 B2 * | 1/2013 | Maddhuri | ............. | G06F 9/5005 705/2 |
| 8,402,139 B2 | 3/2013 | Ferris | | |
| 8,495,648 B1 * | 7/2013 | Brandwine | ............. | G06F 9/505 709/226 |
| 8,583,799 B2 * | 11/2013 | Podila | .................. | G06F 9/5011 709/224 |
| 8,612,566 B2 * | 12/2013 | Ferris | .................... | G06F 15/177 709/222 |
| 8,676,622 B1 * | 3/2014 | Ward, Jr. | ......... | G06Q 10/06313 705/7.11 |
| 8,922,559 B2 * | 12/2014 | Charles | .................. | G06Q 30/02 345/440 |
| 9,007,961 B2 * | 4/2015 | Binder | ................... | H04L 49/101 370/255 |
| 9,009,318 B2 * | 4/2015 | Rangarajan | ........... | G06F 9/5011 709/223 |
| 9,032,077 B1 * | 5/2015 | Klein | ...................... | H04L 29/08 370/395.21 |
| 9,207,993 B2 * | 12/2015 | Jain | ....................... | G06F 9/5094 |
| 2002/0049608 A1 * | 4/2002 | Hartsell | ................. | G06Q 10/10 709/226 |
| 2005/0131898 A1 * | 6/2005 | Fatula, Jr. | ............. | G06F 9/5072 |
| 2008/0005327 A1 * | 1/2008 | Hays | ...................... | G06Q 40/04 709/225 |
| 2008/0080396 A1 * | 4/2008 | Meijer | ..................... | H04L 12/66 370/254 |
| 2008/0228516 A1 | 9/2008 | Gotthelf | | |

(Continued)

FOREIGN PATENT DOCUMENTS

WO 2013/016043 1/2013

OTHER PUBLICATIONS

Foster, Ian, et al. "Cloud computing and grid computing 360-degree compared." Grid Computing Environments Workshop, 2008. GCE'08. Ieee, 2008.*

(Continued)

Primary Examiner — Jimmy H Tran
(74) Attorney, Agent, or Firm — Fish & Richardson P.C.

(57) ABSTRACT

Methods, systems, and apparatus, including computer programs encoded on a computer storage medium, for aggregating requests for resources. In one aspect, a method includes receiving a set of requests for computing resources. Each request specifies one or more computing resources and, for each of the one or more computing resources, a quantity of the computing resource requested. A quantity-based provider condition that a request must meet for inclusion in an allocation process is identified. Each received request that fails to meet the quantity-based provider condition is included in a proper subset. Requests in the proper subset of requests are grouped into one or more groups based at least on the quantity of the one or more resources specified by each request of the proper subset and the quantity-based provider condition. A respective combined request is generated for each group of requests.

20 Claims, 5 Drawing Sheets

(56) References Cited

U.S. PATENT DOCUMENTS

| | | | |
|---|---|---|---|
| 2009/0055507 A1* | 2/2009 | Oeda | G06F 9/4856 709/216 |
| 2009/0138883 A1* | 5/2009 | McLean | G06F 9/50 718/104 |
| 2009/0276771 A1* | 11/2009 | Nickolov | G06F 9/4856 717/177 |
| 2010/0076856 A1 | 3/2010 | Mullins | |
| 2010/0131624 A1* | 5/2010 | Ferris | G06F 9/5072 709/221 |
| 2010/0131625 A1 | 5/2010 | Dehaan et al. | |
| 2010/0169477 A1* | 7/2010 | Stienhans | G06F 9/5083 709/224 |
| 2011/0016214 A1* | 1/2011 | Jackson | G06F 9/5044 709/226 |
| 2011/0131335 A1* | 6/2011 | Spaltro | G06F 9/5072 709/228 |
| 2011/0282982 A1* | 11/2011 | Jain | G06F 9/5094 709/223 |
| 2011/0320606 A1* | 12/2011 | Madduri | G06F 9/5005 709/226 |
| 2012/0116943 A1* | 5/2012 | Abramson | G06Q 40/04 705/37 |
| 2012/0290725 A1* | 11/2012 | Podila | G06F 9/5011 709/226 |
| 2013/0031559 A1 | 1/2013 | Alicherry | |
| 2013/0091047 A1 | 4/2013 | Hough | |
| 2013/0117062 A1 | 5/2013 | Rangarajan | |
| 2014/0068075 A1* | 3/2014 | Bonilla | H04L 41/0823 709/226 |
| 2014/0365662 A1* | 12/2014 | Dave | H04L 67/10 709/226 |
| 2015/0341230 A1* | 11/2015 | Dave | H04L 41/5058 705/7.29 |

OTHER PUBLICATIONS

Wang, Cong, et al. "Privacy-preserving public auditing for data storage security in cloud computing." INFOCOM, 2010 Proceedings IEEE. Ieee, 2010.*

Yu, Shucheng, et al. "Achieving secure, scalable, and fine-grained data access control in cloud computing." INFOCOM, 2010 Proceedings IEEE. Ieee, 2010.*

Buyya, Rajkumar, et al. "Economic models for resource management and scheduling in grid computing." Concurrency and computation: practice and experience 14.13-15 (2002): 1507-1542.*

Buyya, Rajkumar, David Abramson, and Srikumar Venugopal. "The grid economy." Proceedings of the IEEE 93.3 (2005): 698-714.*

"Combinatorial auction," [online] [Retrieved on Nov. 20, 2013]; Retrieved from the Internet URL: http://en.wikipedia.org/wiki/Combinatorial_auction; 2 pages.

"ganeti," [online] [Retrieved on Nov. 20, 2013]; Retrieved from the Internet URL: http://code.google.com/p/ganeti/; 2 pages.

"Google platform," [online] [Retrieved on Nov. 20, 2013]; Retrieved from the Internet URL: http://en.wikipedia.org/wiki/Google_platform; 5 pages.

"Virtual machine," [online] [Retrieved on Nov. 20, 2013]; Retrieved from the Internet URL: http://en.wikipedia.org/wiki/Virtual_machine; 9 pages.

"Welcome to ApacheTM Hadoop®!," [online] [Retrieved on Nov. 20, 2013]; Retrieved from the Internet URL: http://hadoop.apache.org/; 4 pages.

Barroso et al., "The Datacenter as a Computer An Introduction to the Design of Warehouse-Scale Machines," Synthesis Lectures on Computer Architecture #6, Morgan & Claypool Publishers 2009, 120 pages.

Dean, "Designs, Lessons and Advice from Building Large Distributed Systems," Oct. 29, 2009, [online] [Retrieved on Nov. 20, 2013]; Retrieved from the Internet URL: www.cs.cornell.edu/projects/ladis2009/talks/dean-keynote-ladis2009.pdf; 73 pages.

Lee et al., "A Real-time Group Auction System for Efficient Allocation of Cloud Internet Applications," IEEE Transactions on Services Computing, IEEE Computer Society Digital Library, Apr. 2, 2013, 30 pages.

Papagianni et al., "On the Optimal Allocation of Virtual Resources in Cloud Computing Networks," IEEE Transactions on Computers, 62(6):1060-1071, Jun. 2013.

Vinothina et al., "A Survey on Resource Allocation Strategies in Cloud Computing," IJACSA 3(6):97-104, 2012.

Vries et al., "Combinatorial Auctions: A Survey," Journal on Computing; 15(3):284-309, 2003, 26 pages.

Zaman et al., "Combinatorial Auction-Based Allocation of Virtual Machine Instances in Clouds," cloudcom, IEEE Second International Conference on Cloud Computing Technology and Science, pp. 127-134, 2010.

Zaman et al., "Combinatorial Auction-Based Dynamic VM Provisioning and Allocation in Clouds," IEEE Transactions on Parallel and Distributed Systems 2012, 8 pages.

Barroso et al., "Web Search for a Planet: The Google Cluster Architecture," IEEE Computer Society 2003, 7 pages.

* cited by examiner

AGGREGATING RESOURCE REQUESTS

BACKGROUND

Cloud computing and other distributed computing systems allow resource providers to offer computing resources for use by others over a network. For example, a resource provider may host a web-based application for a business, and enable use of the web-based application over the Internet. Furthermore, some companies have organizational distributed computing systems in which employees or departments may be able to request and use computing resources of the distributed computing system.

Often, however, there is mismatch between the size and shape of demands from customers of the cloud infrastructure and the size and shape of the deployed physical infrastructure to fulfill those customers' demands. Thus, a provider of cloud computing services must efficiently shape the demand to fit the shape of the deployed physical infrastructure and sometimes scale the cloud based infrastructure over time to meet the demands of its customers.

SUMMARY

In general, one innovative aspect of the subject matter described in this specification can be embodied in methods that include the actions of receiving a set of requests for computing resources, each request specifying one or more computing resources and, for each of the one or more computing resources, a quantity of the computing resource requested; identifying a quantity-based provider condition that a request must meet for inclusion in an allocation process that allocates computing resources based on requests for the computing resources; including in a proper subset of the requests, each received request that fails to meet the quantity-based provider condition; grouping requests in the proper subset of requests into one or more groups based at least on the quantity of the one or more resources specified by each request of the proper subset and the quantity-based provider condition, each group including one or more requests, and at least one group including requests received from different resource requesters; generating a respective combined request for each group of requests, each combined request being a request that meets the quantity-based provider condition; providing each combined request and each request of the set of requests that independently meet the quantity-based supplied constraint as inputs to the allocation process; receiving data specifying an allocation of a set of computing resources from the allocation process; and providing data that causes the set of resources to be allocated to resource requesters based on the specified allocation. Other embodiments of this aspect include corresponding systems, apparatus, and computer programs, configured to perform the actions of the methods, encoded on computer storage devices.

These and other embodiments can each optionally include one or more of the following features. The quantity-based condition can specify a particular quantity of resources that must be requested for inclusion in the allocation process. Aspects can further include identifying two or more requests for which a sum of the quantities of the one or more resources specified by the two or more requests meets the particular quantity of resources and determining to group the two or more resources in response to the sum meeting the particular quantity of resources.

The quantity-based condition can specify a particular quantity of resources that must be requested for inclusion in the allocation process. Aspects can further include determining that a sum of the quantities of the one or more resources specified by requests of a particular group is less than the particular quantity of resources; and increasing the quantity specified by each request of the particular group such that a sum of the increased quantities of the one or more resources specified by the group meets the particular quantity specified by the quantity-based condition.

Aspects can further include determining that a sum of the quantities of the one or more resources specified by requests of a particular group is less than a particular quantity of resources specified by the quantity-based condition; identifying a quantity of excess resources to be requested in a combined request for the particular group based on a difference between a sum of the quantities and the particular quantity of resources specified by the quantity-based condition; identifying a cost for a compliant request that meets the particular quantity specified by the quantity-based condition; determining a cost for the excess resources based on the cost for the compliant request and the quantity of excess resources to be requested; and dividing the cost for the excess resources between the each request included in the particular group.

Dividing the cost of the excess resources between each request included in the particular group can include determining that a first quantity of the one or more computing resources specified by a first request included in the particular group is less than a second quantity of the one or more computing resources specified by a second request included in the particular group; and assigning a greater proportional share of the cost of the excess resources to the first request than the second request in response to determining that the first quantity is less than the second quantity.

The provider condition can specify a preferred ratio between a quantity of a first computing resource and a quantity of a second computing resource included in a request. Grouping the proper subset of requests into one or more groups can include identifying a first request and a second request of the proper subset as candidates for a particular group; determining a combined ratio between (a) a total quantity of the first resource specified by the first request and the second request; and (b) a total quantity of the second resource specified by the first request and the second request; determining that the combined ratio is within a threshold amount of the preferred ratio; and determining to group the first and second requests in a particular group together in response to determining that the combined ratio is within a threshold amount of the preferred ratio.

Grouping the proper subset of requests into one or more groups can include identifying a first request and a second request of the proper subset as candidates for a particular group, the first request including a first bid specifying an amount that a first requester is willing to pay for the one or more computing resources specified by the first request, and the second request includes a second bid specifying an amount that a second requester is willing to pay for the one or more computing resources specified by the second request; determining that the amount of the first bid is within a threshold amount of the amount of the second bid; and determining to group the first and second requests in a particular group together in response to determining that the amount of the first bid is within a threshold amount of the second bid.

The allocation process can include an auction that allocates the set of resources based on bid amounts specified by the requests provided as input to the allocation process.

Aspects can further include determining a bid amount for a combined request for the particular group based on the amounts specified by the first and second bids. Each request can specify the one or more computing resources in abstract computing units.

Particular embodiments of the subject matter described in this specification can be implemented so as to realize one or more of the following advantages. Resource requests that do not conform to supplier's conditions, such as quantity-based conditions, can be grouped and aggregated to form combined requests that conform to the conditions. By aggregating requests, requests for smaller quantities of computing resources can be included in a resource allocation process without requiring the resource requester to request more than the desired amount of resources. Computing resources are allocated more efficiently by aggregating requests that do not meet quantity-based and/or other types of conditions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
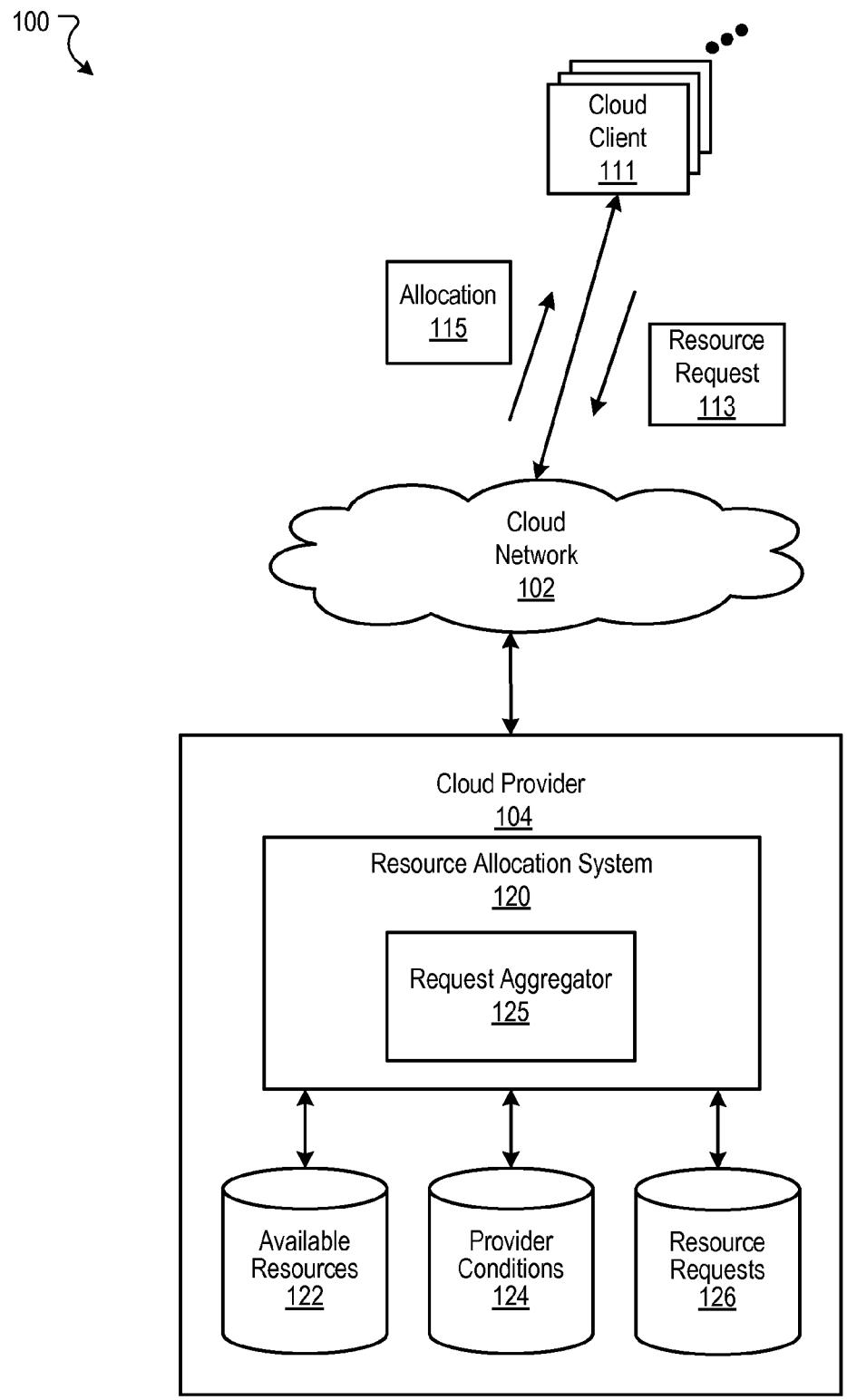
FIG. 1 is a block diagram of an example environment in which a cloud provider provides the use of computing resources to cloud clients by way of a cloud network.

A system can group requests for computing resources that do not meet a quantity-based condition, such as a unit resource requirement, for a supply of computing resources. As used herein, a quantity-based condition specifies a particular resource request must be for a particular quantity of the resource for each allocation request. The type of computing resource and the quantity depend on the particular quantity-based condition. For example, a computing resource provider, such as a cloud provider, may deploy computing resources in racks and may require that each request be for a particular number of racks of computing resources. However, some resource requesters may require or desire less than the required number of racks or have some overflow from a request that requires more than the particular number of racks. Such requests that require less than a quantity-based condition, or more than a quantity-based condition (or more than a whole multiple of a quantity-based condition) are referred to as "non-compliant requests." The system can group non-compliant requests, e.g., from multiple different requesters unaffiliated with one another, to form compliant requests that meet the quantity-based condition. The compliant requests can then be input to a process that allocates computing resources based on the requests.

Quantity-based conditions, as described above, can also define the requirements in terms of discrete units. For example, a cloud provider may require that each request specify ten racks. In some instances, a group of resource requests may not completely meet the conditions of the cloud provider. A group of two requests may combine for a request of eight racks, such as 4.9 for a first request (e.g., submitted by a first requester) and 3.1 for a second request (e.g., submitted by a second requester different from the first requester). The system can round up each request (e.g., to 5 racks and 4 racks), resulting in the group of requests being non-compliant based on being short one rack. The cost of the one additional rack can be split between the two requests (e.g., based on the amount of racks requested in each request) to form a compliant request for ten racks. If the one rack can later be sold to another requester, then the cost may be recovered for the two requesters.

Another condition that may be placed upon requests is a ratio-based condition. As used herein, a ratio-based condition specifies a preferred or required ratio between the quantities of two computing resources specified in a request. For example, the ratio-based condition can be based on ratios between the quantities of two or more resources that are installed together in a rack. A rack of computing resources often includes a particular number of processor cores and a particular amount of data storage (or particular amounts of other types of computing resources, such as networking devices). The cloud provider may prefer requests (or combined requests) that have a ratio of processor cores to data storage that matches or is close to matching a ratio between processor cores and data storage for its racks (or ratios for other computing resources). The system can identify requests to include in a combined request such that the ratio for the combination of the requests closely matches the specified ratio for the racks.

The system can also identify requests to group into a combined request based on other features of the requests. For example, if the resource allocation process employs an auction based on bids, requests having similar bid values may be grouped together. Each request in the combined request may win or lose allocation of resources based on the bid amount for the combined request. The bid for the combined request may be based on the individual bids that make up the combined request.

The requests can be in terms of (or converted to) abstract computing units rather than actual discrete computing resources. For example, each request may be for a particular amount of computing power, or in terms of an abstract computing unit ("ACU") that is based on a particular amount of computing power. In addition, the cloud provider may require that each request specify a particular amount of computing power, such as ten units of computing power. The use of abstract units allows the cloud provider flexibility in how it provides the resources to the requesters. For example, the cloud provider may be able to provide a particular amount of computing power using two processor cores in a situation where a resource requester may request four processor cores.

These features and other features are described in more detail with reference to FIGS. 1-6 and the written description below.

FIG. 1 is a block diagram of an example environment 100 in which a cloud provider 104 provides the use of computing resources to cloud clients 111 by way of a cloud network 102. The cloud network 102, which can include a local area network (LAN), wide area network (WAN), the Internet, or a combination thereof, connects the cloud provider 104 (and its computing resources) with the cloud clients 111.

The cloud provider 104 can provide the use of computing resources, such as processors, data storage, virtual machines, and software applications over the cloud network 102. In some implementations, the cloud provider 104 is an Information Technology ("IT") group (e.g., within a company or external IT provider) that makes computing resources available to individuals or groups within an organization by way of an Intranet, WAN, or other type of network. The cloud provider 104 may also be a third party broker that allocates computing resources from one or multiple cloud computing providers.

The resources provided via the cloud network 102 can include raw computing resources, machine-level resources, racks of computing resources, and other types of computing resources that are accessible over a cloud network 102. For example, the resources may include processor cores, memory, data storage, network devices, and/or software applications. The resources can be provided in discrete units or in groups, e.g., a group of processors and memory. The resources can also be distributed across multiple locations. For example, the resources provided by a cloud provider 104 may be distributed across multiple resource centers that are located in different parts of the world.

The cloud provider 104 can specify one or more conditions that resource requests must meet to be allocated the computing resources of the cloud provider 104. A variety of appropriate conditions for managing allocations can be used. For example, the cloud provider 104 may specify, as a condition, that each request must be for a particular quantity of a resource. This quantity-based condition may be expressed in terms of discrete resources (e.g., ten processor cores), in terms of a group or installation of resources (e.g., five racks of resources), and/or in terms of abstract computing units (e.g., twenty ACUs that are based on computing power). The cloud provider 104 may also specify a ratio-based condition. The ratio-based condition can specify a preferred or required ratio between the quantities for two types of computing resources. For example, an installation (e.g., rack) of computing resources may include a particular ratio between two resources, such as a ratio between processor cores and data storage. The cloud provider 104 may specify that requests must be within a threshold amount of the ratio. The conditions can be stored in a provider conditions data store 124.

Individuals and organizations can request computing resources by submitting resource requests 113 to the cloud provider 104 using a cloud client 111 (e.g., a computer). The resource requests 113 may include data identifying one or more computing resources that the individual or organization is requesting to use. The resource requests 113 may also include data specifying a quantity of the resource that is requested. The cloud provider 104 can store the resource requests 113 and/or data regarding the requested resources in a resource requests data store 126.

The cloud provider 104 includes a resource allocation system 120 that allocates available computing resources identified in the available resource data store 122 (or a portion of the available resources) based, at least in part, on the resource requests 113. In some implementations, the resource allocation system 120 allocates the resources using an auction process. For example, each resource request 113 may include a bid for the desired resource(s). The bid may specify an amount that the individual or organization that submitted the resource request 113 is willing to pay for allocation of the resource(s). The resource allocation system 120 can allocate the computing resources based on the bids specified by the resource requests 113. In some implementations, the resource allocation system 120 allocates the computing resources based on other factors, such as priority or need. For example, an IT department for an organization may allocate computing resources based on the particular need of each resource requester (e.g., department, group, or individual) within the organization.

The resource allocation system 120 can also provide resource allocation data 115 to the cloud clients 111. The resource allocation data 115 for a particular cloud client 111 may include data specifying computing resources allocated to the cloud client 111 and, for auction-based implementations, the winning bid for each of the allocated resources.

The resource allocation system 120 includes a request aggregator 125. The request aggregator 125 can group resource requests 113 that are non-compliant request into groups, for example, to generate compliant requests that meet conditions of the cloud provider 104. As an example, a cloud provider 104 may specify, as a condition, that each request for its computing resources request a particular quantity of ACUs or a particular quantity of racks. The request aggregator 125 can group resource requests that specify less than the particular quantity to form combined requests that are for the particular quantity of ACUs or the particular number of racks. These combined requests can be adjusted, if needed, to form compliant requests and include an allocation process (e.g., an auction process performed by the resource allocation system 120) with other compliant requests (e.g., resource requests originally for the particular quantity). Each group can include one or more resource requests 113. In addition, a group may include resource requests 113 received from two or more different cloud clients 111, e.g., from two or more individuals or organizations that are not affiliated with each other.

Figure 2:
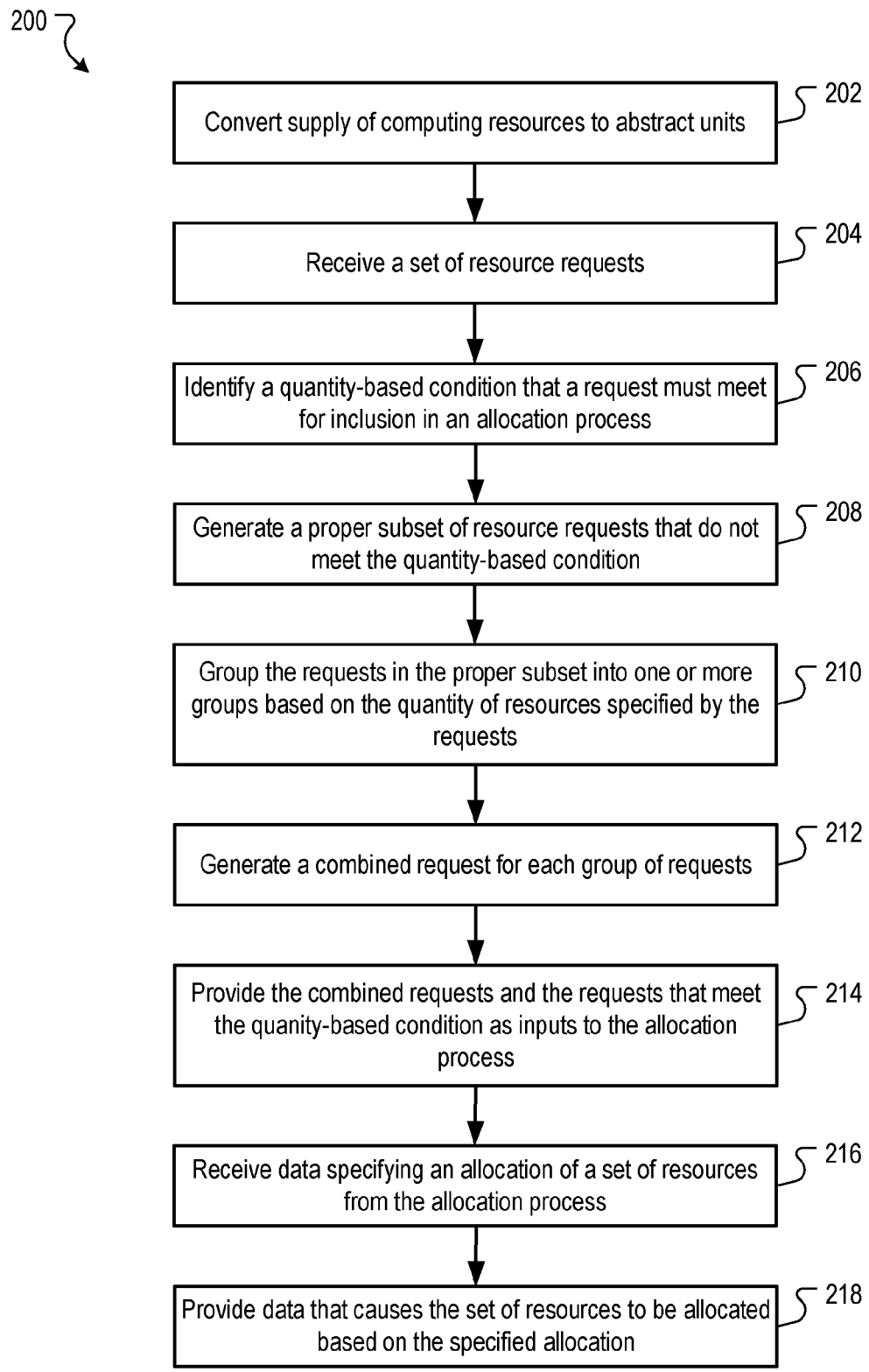
FIG. 2 is a flow chart of an example process for allocating resources.

FIG. 2 is a flow chart of an example process 200 for allocating computing resources. Operations of the process 200 can be implemented, for example, by a data processing apparatus, such as the resource allocation system 120 and/or the request aggregator 125 of FIG. 1. The process 200 can also be implemented by instructions stored on computer storage medium, where execution of the instructions by a data processing apparatus cause the data processing apparatus to perform the operations of the process 200.

In general, the process 200 allocates available computing resources to cloud clients based on resource requests received from the cloud clients and conditions, such as quantity-based conditions, specified for the computing resources, for example, by the cloud provider 104. Resource requests that do not meet the conditions may be grouped to form combined compliant requests before being provided to an allocation process, such as an auction process. Although the process 200 is described in terms of allocating computing resources based on ACUs, the process 200 can also be used to allocate computing resources based on racks, discrete computing resources, combinations of computing resources, or other sizes of computing demand.

A supply of computing resources is converted into ACUs (202). In some implementations, the supply of computing resources can be delineated into groups based on their characteristics, such as geographic location, required failure domains, and network constraints. For each group, the supply of computing resources can be converted to ACUs based on the amount of computing power available in the group. Each ACU may be based on a particular amount of computing power, such as a particular amount of data processing power, a particular amount of bandwidth and/or a particular amount of data storage. The amount of ACUs per group can be determined based on the computing power available in the group and the amount of computing power per ACU.

A set of resource requests 113 is received (204). The resource requests 113 may be received from one or more cloud clients 111, for example, that are operated by individuals or organizations that would like to use computing resources. Each resource request 113 can specify one or more computing resources (e.g., in abstract terms or in terms of the actual requested resources), a quantity of each computing resource requested, and, for auction-based implementations, a bid specifying an amount the individual or organization is willing to pay for allocation of the computing resource(s). For resource requests that specify actual resources, such as racks or processor cores, the request can be converted to ACUs based on the computing power of the resources requested. The resource requests 113 can also specify required or preferred attributes of the computing resources. For example, a resource request may specify a minimum redundancy and/or a particular geographic area in which the computing resources should be located.

A quantity-based condition that resource requests 113 are to meet is identified (206). A quantity-based condition can specify that each request for a particular computing resource must be for a particular quantity of the resource. This quantity may be expressed in terms of a particular quantity of ACUs, such as twenty ACUs.

A proper subset of resource requests whose requested quantity of computing resource does not meet the quantity-based condition for their requested computing resources are identified (208). The identified resource requests of the proper subset can include resource requests for which the requested quantity is less than the quantity specified by the quantity-based condition for the computing resources specified by the resource requests. For example, a resource request may specify ten ACUs of resources that are provided by the cloud provider. In this example, if the quantity-based condition specified by the particular cloud provider is greater than ten, the resource request may be identified for inclusion in the proper subset.

Some resource requests may also specify a quantity of computing resources that exceeds the quantity-based condition for the requested resource. Such a resource request may be separated into multiple resource requests that meet the quantity-based condition. If there is any overflow, the overflow may be contained in a resource request that is identified for the proper subset. For example, consider a quantity-based condition that requires each resource request to specify five racks of computing resources and a resource request for twelve racks of computing resources. In this example, three resource requests may be generated. Two of the resource requests may be for five racks each. The other resource request may be for two racks, which is less than the required five racks. Thus, this other resource request may be identified for the proper subset.

The resource requests of the proper subset are grouped into one or more groups (210). The resource requests may be grouped based on the quantity of the resources specified by the resource requests, and optionally other characteristics. For example, the request aggregator 125 can identify resource requests to include in a particular group such that the total quantity of a computing resource for the group matches or is close to matching the quantity-based condition for the cloud provider.

The resource requests can be grouped in a manner to minimize (or at least reduce) the difference between the quantity of computing resources specified by the resource requests of each group and the quantity-based condition. For example, two or more resource requests for which their total quantity of requested computing resources meets the quantity-based condition may be included in a group together. In addition, two or more resource requests for which their total quantity of requested computing resources is within a threshold amount of the quantity-based condition may be included in a group together.

A combined resource request is generated for each group (212). The combined resource request for a group can specify the computing resources requested by its group of resource requests and a total quantity of the computing resources for the group. In some implementations, each combined resource request is configured as a compliant request that meets the respective quantity-based condition for the resources specified by the resource requests of the group. If the total quantity of computing resources is less than the quantity-based condition, the individual quantities for the resource requests can be increased such that the total quantity meets the quantity-based condition. For example, consider a quantity-based condition of ten ACUs per resource request and a group that has resource request A for four ACUs and resource request B for four ACUs. Both quantities can be increased to five ACUs (for a total of ten ACUs) to meet the condition of ten ACUs for the group request.

For auction-based implementations, each combined request may include a bid for the computing resources of the combined request. The bid may be based on the individual bids of each resource request included in the group for which the combined request was generated. For example, a combined request may be for two individual resource requests that each specify ten units of a computing resource and that have different bid amounts for the units. In this example, the two bid amounts may be combined to form a bid for the combined request. For example, the bid amount of the combined request may be the average of the two bid amounts, the weighted average of the two bid amounts (e.g., weighted based on the relative quantity of resources requested by each request), or some other measure of central tendency for the two bid amounts.

In some implementations, the individual resource requests that make up a combined request win or lose allocation of computing resources together based on the bid for the combined request. As described in more detail below, the resource requests can be grouped based on their bid amounts such that the bid for the combined requests are close to that of the bid amounts of the individual resource requests of the combined request.

The combined requests and the resource requests that meet their respective quantity-based condition independently are provided as inputs to an allocation process (214). The allocation process may be an auction process or another process for allocating a set of available computer resources based on requests. In an auction process, the available computing resources may be allocated to the cloud clients based on the bids (e.g., combined bids for the combined requests and the bids for resource requests that meet their respective quantity-based condition independently).

Data specifying an allocation of the set of computing resources is received (e.g., by the resource allocation system 120) from the allocation process (216). In addition, data regarding computing resources allocated to a cloud client can be provided to the cloud client.

Data is provided that causes the set of resources to be allocated to resource requesters based on the specified allocation (218). For example, the data may be provided to an apparatus (e.g., an apparatus that is part of, or separate from, the resource allocation system 120) that allows access to the allocated computing resources based on the data.

In some implementations, the request aggregator 125 considers additional characteristics of resource requests in determining whether to group the resource requests to form a compliant request. For example, a cloud provider 104 may install a particular number of processor cores and a particular amount of data storage in each rack, thus forming a ratio between the number of processors and the amount of data storage for the racks. The cloud provider 104 may prefer (or require) resource requests 113 (or combined requests) that have a ratio between a number of requested processor cores and an amount of data storage that is within a threshold amount of the ratio for the racks. In another example, the request aggregator 125 may group resource requests having similar bid amounts (e.g., within a threshold amount) for auction-based implementations.

Figure 3:
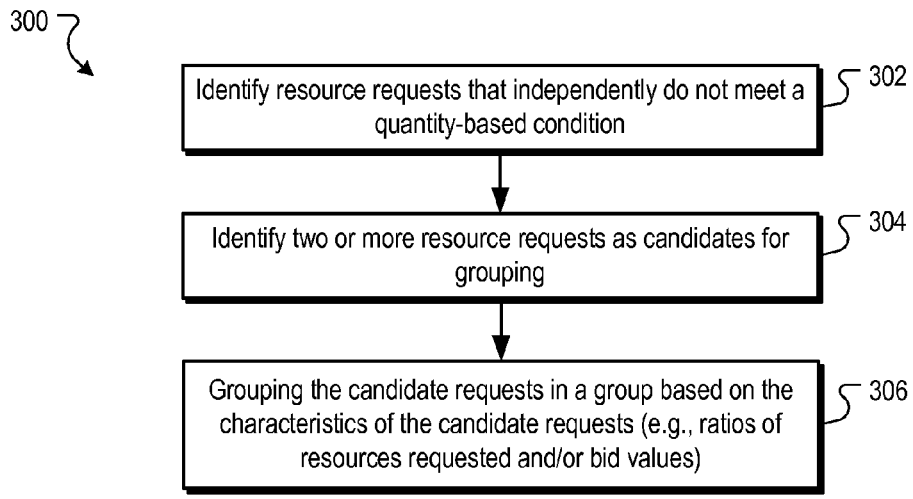
FIG. 3 is a flow chart of an example process for grouping resource requests.

FIG. 3 is flow chart of an example process 300 for grouping resource requests. Operations of the process 300 can be implemented, for example, by a data processing apparatus, such as the resource allocation system 120 of FIG. 1. The process 300 can also be implemented by instructions stored on computer storage medium, where execution of the instructions by a data processing apparatus cause the data processing apparatus to perform the operations of the process 300.

Resource requests that do not independently meet a quantity-based condition for computing resources specified by the resource requests are identified (302). For example, as described above, a cloud provider may specify a quantity-based condition that resource requests, and combined requests, must meet for the computing resources to be considered for allocation to the cloud clients. Resource requests that do not meet the quantity-based condition may be identified, for example, for inclusion in a proper subset of resource requests.

Two or more resource requests are identified as candidates for grouping together in a group (304). The resource requests may be identified as candidates for grouping based on attributes or characteristics of the candidate requests. For example, resource requests that specify the same resource may be identified as candidates for a group together. The resource requests may also be identified as candidates for grouping based on the quantity of computing resources specified by the resource requests. For example, the resource requests may be identified as candidates in response to the sum of the quantities of computing resources specified by the identified resource requests being equal to or within a threshold amount of a quantity-based condition for the computing resources.

The candidate requests are grouped together based on characteristics of the candidate requests (306). For example, the request aggregator 125 may consider additional characteristics in addition to the quantity of the computing resources requested in determining whether to group the resource requests to form a combined request. These additional characteristics may include a ratio between quantities of two types of computing resources requested and/or similarity between bids for computing resources. For example, the request aggregator 125 may attempt to group resource requests such that the total quantity of computing resources requested by the group matches or is close to matching (e.g., within a threshold amount) the quantity-based condition specified by the cloud provider for the computing resources and such that an aggregate ratio between two types of computing resources requested by the group matches or is close to matching (e.g., within a threshold amount) a preferred ratio specified by the cloud provider. The request aggregator 125 may also attempt to group resource requests such that the total quantity of computing resources requested by the group matches or is close to matching (e.g., within a threshold amount) the quantity-based condition specified by the cloud provider for the computing resources and such that the bids for each request in the group are similar (e.g., within a threshold amount).

Figure 4:
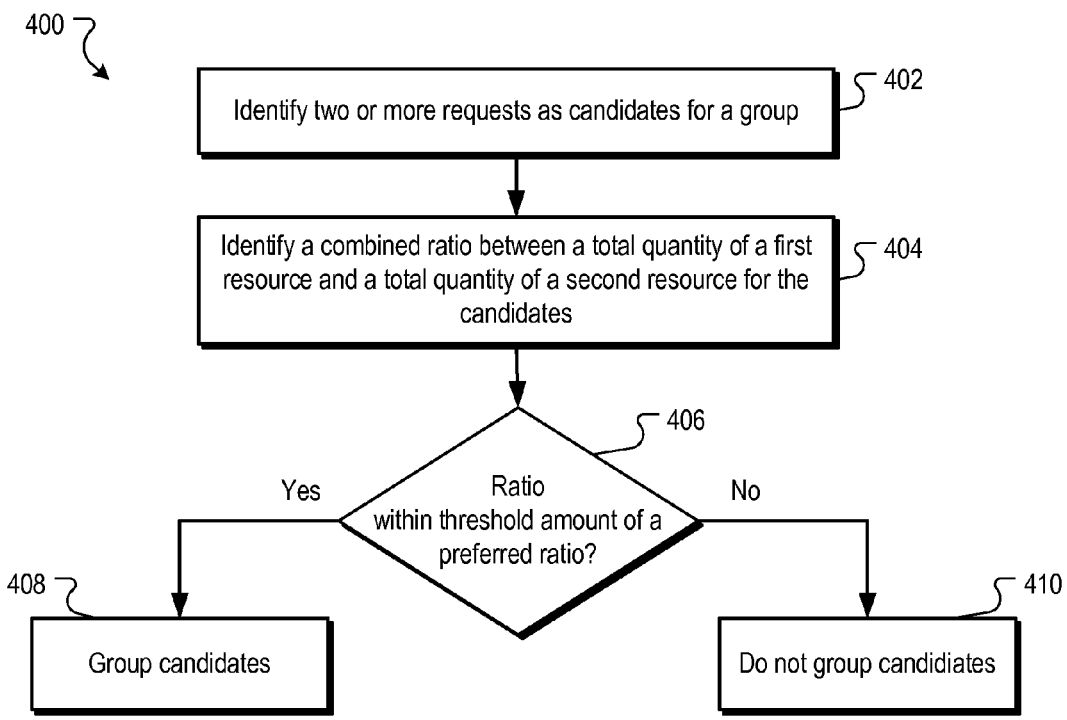
FIG. 4 is a flow chart of another example process for grouping resource requests.

FIG. 4 is a flow chart of an example process 400 for grouping resource requests using ratios between quantities of computing resources. Operations of the process 400 can be implemented, for example, by a data processing apparatus, such as the resource allocation system 120 of FIG. 1. The process 400 can also be implemented by instructions stored on computer storage medium, where execution of the instructions by a data processing apparatus cause the data processing apparatus to perform the operations of the process 400.

Two or more resource requests are identified as candidates for a group (402). For example, the two or more candidate requests may be identified from a proper subset of resource requests that do not meet a quantity-based condition. The two or more candidate requests may be identified as candidates based on their requested quantities of computing resources and/or other characteristics as described above with reference to FIG. 3. Each of the two or more candidate requests may specify two or more types of computing resources that are being requested. For example, each candidate request may specify a particular quantity of processor cores and a particular amount of data storage requested by its respective cloud client.

A combined ratio is determined for the candidate requests (404). The combined ratio may be a ratio between a total quantity of a first computing resource and a total quantity of a second computing resource for the candidate requests. For example, the first computing resource may be processor cores and the second computing resource may be data storage. In this example, the combined ratio would be a ratio between the total number of processor cores requested by the candidate requests and the total amount of data storage requested by the candidate requests.

A determination is made whether the combined ratio is within a threshold amount of a preferred ratio for the computing resources (406). For example, the resource provider for the two types of computing resources may specify a preferred ratio based on the ratio between the resources in actual installations for the resources. If the combined ratio is within the threshold amount of the preferred ratio, the candidate requests are grouped to form a combined request (408). Otherwise, if the combined ratio is not within the threshold amount of the preferred ratio, the candidate requests are not grouped to form a combined request (410). Instead, other candidates may be evaluated for grouping.

Figure 5:
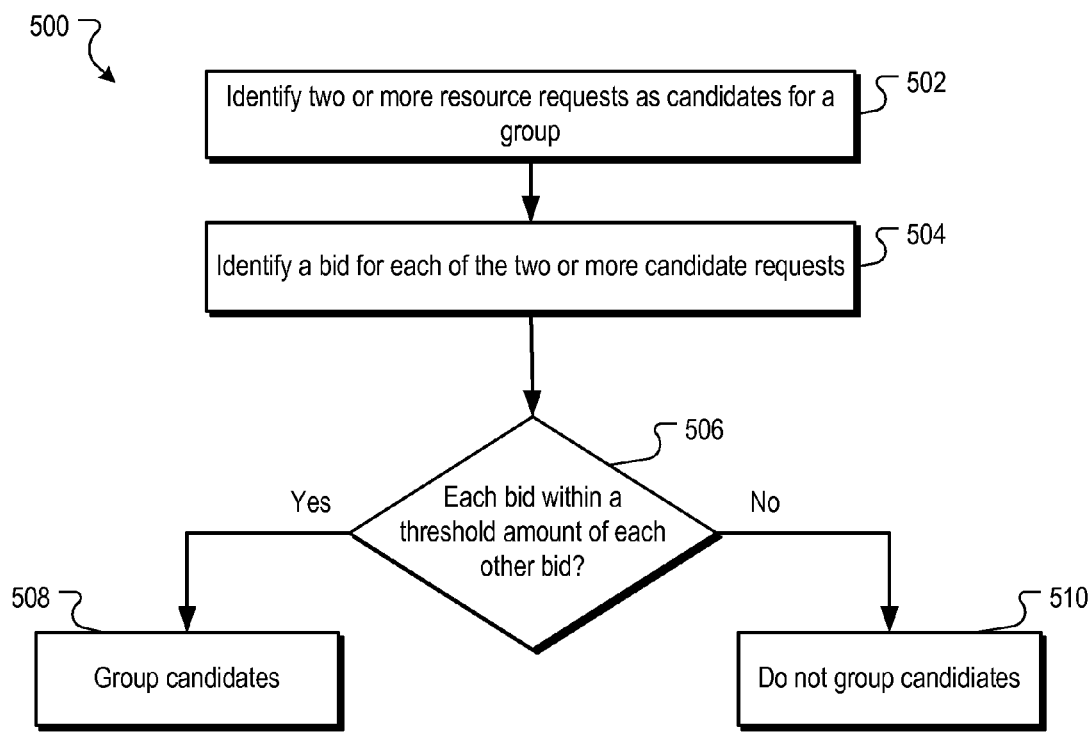
FIG. 5 is a flow chart of another example process for grouping resource requests.

FIG. 5 is a flow chart of an example process 500 for grouping resource requests based on bid values. Operations of the process 500 can be implemented, for example, by a data processing apparatus, such as the resource allocation system 120 of FIG. 1. The process 500 can also be implemented by instructions stored on computer storage medium, where execution of the instructions by a data processing apparatus cause the data processing apparatus to perform the operations of the process 500.

Two or more resource requests are identified as candidates for a group (502). For example, the two or more candidate requests may be identified from a proper subset of resource requests that do not meet a quantity-based condition. The two or more candidate requests may be identified as candidates based on their requested quantities of computing resources and/or other characteristics as described above with reference to FIG. 3.

A bid is identified for each of the two or more candidate requests (504). The bid for each candidate request may specify an amount the individual or organization that submitted the candidate request is willing to pay for allocation of the resources specified by the candidate request.

A determination is made whether the bids for the candidate requests are within a threshold amount of each other (506). For example, the amount of each bid may be compared to the amount of each other bid to determine whether the bids are within a threshold amount of each other. If the bids are not within a threshold amount of each other, the candidate requests may not be grouped to form a combined request (510).

If the bids are within a threshold amount of each other, the candidate requests may be grouped to form a combined request (508). Additionally, the bid for the combined request may be determined based on the bids for the candidate requests. For example, the bid for the combined request may be the average or weighted average of the individual bids of the candidate requests. The bids may be weighted based on the quantity of computing resources requested by each candidate request. For example, if a first of the candidate requests is for ten ACUs and a second is for twenty ACUs, the bid of the second candidate may be weighted more (e.g., double) than the bid for the first candidate request.

Figure 6:
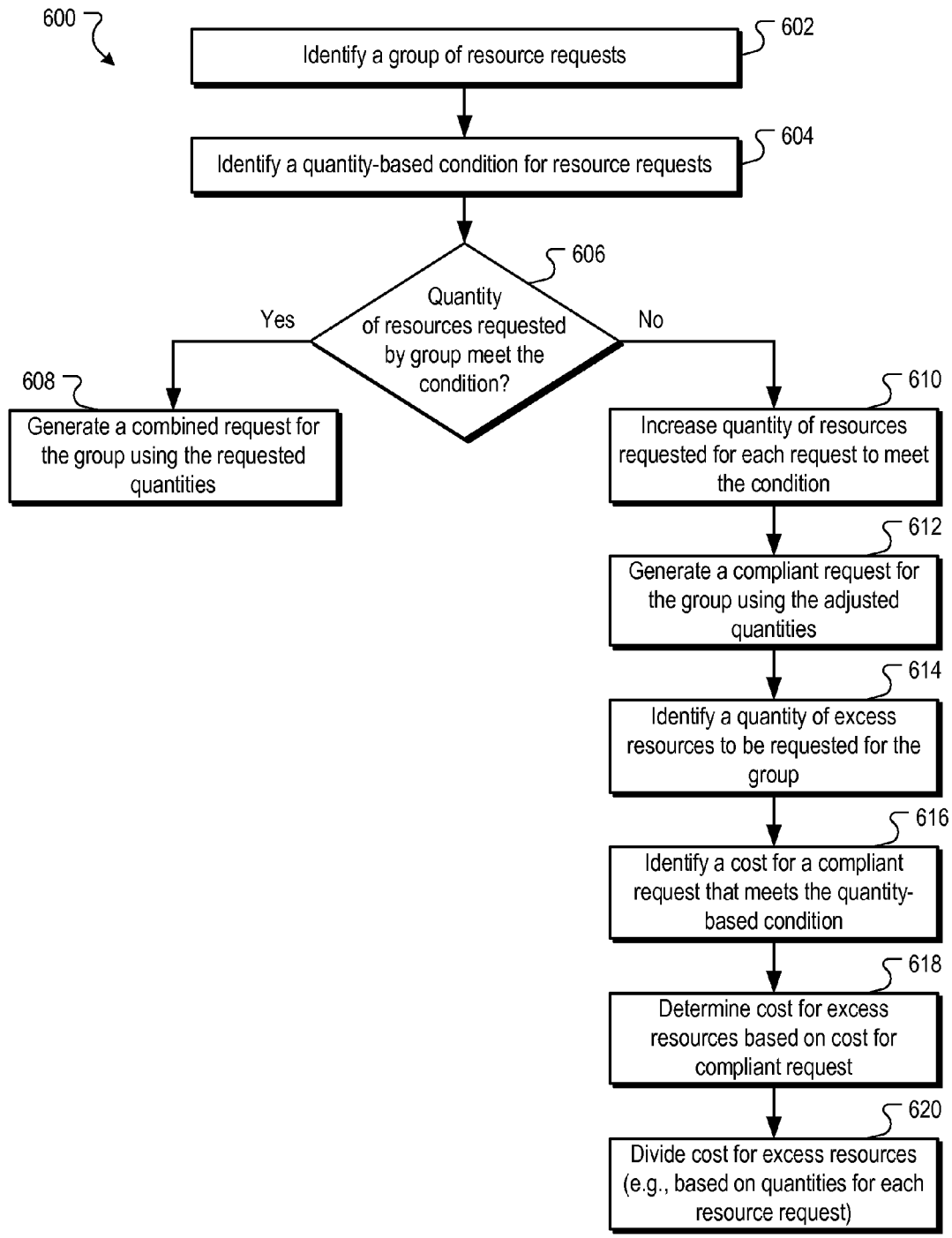
FIG. 6 is flow chart of an example process for generating compliant resource requests for groups of resource requests.

After identifying groups of resource requests, the groups can be used to form combined requests that are eligible for an allocation process. FIG. 6 is a flow chart of an example process 600 for generating compliant resource requests for groups of resource requests. Operations of the process 600 can be implemented, for example, by a data processing apparatus, such as the resource allocation system 120 of FIG. 1. The process 600 can also be implemented by instructions stored on computer storage medium, where execution of the instructions by a data processing apparatus cause the data processing apparatus to perform the operations of the process 600.

A group of resource requests is identified (602). The group of requests can include one or more, or two or more resource requests that were identified for inclusion in a group. For example, the resource request(s) may be identified for a group using one or more of example processes 300-500 illustrated in FIGS. 3-5 and described above.

A quantity-based condition for the resource requests of the group is identified (604). For example, the cloud provider that is making the computing resources available may specify a particular quantity of the computing resources that must be requested to be included in an allocation process that allocates the computing resources.

A determination is made whether the quantity of computing resources requested by the group (e.g., sum of the quantities of each individual resource request of the group) meet the quantity-based condition (606). If the quantity of computing resources requested by the group meets (e.g., equals) the quantity-based condition, a combined request may be generated for the group (608). This combined request may be a compliant request that is eligible for the allocation process in response to quantity of computing resources requested by the group meeting the quantity-based condition.

If the quantity of computing resources requested by the group does not meet (e.g., is less than) quantity specified by the quantity-based condition, the quantity of the resources requested by each resource request of the group may be increased (610). If one or more of the quantities specifies a non-integer quantity, the quantity may be rounded up to the next integer. For example, the quantity-base condition may be 10 ACUs, and the group may include a first request for 4.1 ACUs and a second request for 2.8 ACUs. The quantity of the first request may be increased to 5.0 ACUs and the quantity of the second request may be increased to 3.0 ACUs.

If, after rounding, the combined quantity is less than the quantity specified by the quantity-based condition, the quantities can be further increased to meet the quantity specified by the quantity-based condition. Or, some excess resources may be included in a combined request. As described below, the cost for the excess resources can be divided between the cloud clients. If the excess resources can be used by another cloud client, the excess can be allocated to the other cloud client and the cost for the excess resources can be recovered, or at least partially recovered.

A compliant request is generated for the group in response to the increased quantities meeting the condition or an amount of excess resource being included in the combined request (612). The compliant request can be provided as input to the allocation process.

A quantity of excess resources for the group used to form the combined request is identified (614). Continuing the previous example, the quantity-based condition specified 10 ACUs and the adjusted total quantity for the group was 8.0 ACUs (5.0+3.0). In this example, the excess amount of computing resources needed to make the combined request compliant is 2.0 ACUs.

A cost for allocation of resources for a compliant request is identified (616). For example, the combined, compliant request may be provided as input to an auction-based allocation process that allocates computing resources based on a bid for the resources. The allocation process may also assign a cost for the request based on the bid, or a next highest bid. For example, the cost for a request that wins allocation may be based on the next highest bid plus a particular amount.

The cost for the excess resources is identified based on the cost for the compliant request (618). For example, the cost for the excess resources may be based on its portion of the total resources specified by the combined requests. Continuing the previous example, there are 2.0 ACUs of excess resources in a combined request for 10 ACUs. In this example, the cost for the excess resources may be 20% of the total cost for the combined request.

The cost for the excess resources is divided between the cloud clients (620). In some implementations, the cost may be divided equally between the multiple cloud clients. In some implementations, cloud clients that requested lesser amounts of resources may bear more of the cost for the excess resources than cloud clients that requested more resources. Without grouping and aggregation, the cloud clients that requested fewer quantities of resources may have had to request more excess resources to be eligible for allocation of any resources. Thus, they may, on some implementations, be required to bear more of the cost for the excess resources of the group.

For example, consider a quantity-based condition specifying 6.0 ACUs per request. A first resource request that specifies 0.7 ACUs may be grouped with a second resource request that specifies 2.2 ACUs. In block 610, the quantities of the resource request may be rounded up to 1.0 ACUs for the first resource request and 3.0 for the second resource request. The group's total quantity in this example is 4.0 ACUs, which is 2.0 less than the condition of 6.0 ACUs. To make a combined request for the group compliant, 2.0 excess ACUs must be included in the request. Without grouping and aggregation, the first resource request would include 5.0 excess ACUs and the second resource request would include 3.0 excess ACUs. In some implementations, ratios between the excess resources of the original requests and the total quantity of excess resources that would be requested by the two original requests before grouping can be used to determine how to assign the costs of the excess resources between the cloud clients. For example, Relationship (1) below can be used to determine the quantity of excess resources for which an individual or organization associated with a cloud client is charged.

$$\text{Relationship: Excess Quantity for Request} = OEQ/TOEQ * EQG \quad (1)$$

In Relationship (1), "Excess Quantity for Request" is the quantity of excess computing resources of the combined request for the group for which a cloud client is responsible; "TOEQ" is the total original excess quantity of computing resources for the resource requests in the group before grouping; "OEQ" is the original quantity of excess computing resources for the resource request; and "EQG" is the excess quantity of computing resources for the group after grouping. Continuing the previous example, the excess quantity for which the cloud client that submitted the first resource request would be responsible using Relationship (1) would be 5.0/8.0*2.0, or 1.25 ACUs. In this example, the TOEQ is 8.0 (5.0 excess resources for the first request+3.0 excess resources for the second resource request). The excess quantity for which the cloud client that submitted the second resource request would be responsible using Relationship (1) would be 3.0/8.0*2.0=0.75 ACUs. For the combined, compliant request of 6.0 ACUs, the first resource request would be for a total of 2.25 ACUs (1.0 ACU+1.25 ACU) and the second resource request would be for a total of 3.75 ACUs (3.0 ACUs+0.75 ACUs). If the 2.0 excess ACUs can be assigned to another cloud client, the costs of the 2.0 ACUs can be recouped and distributed to the individuals or organizations associated with the two cloud clients.

Although the example operating environment and processes described above have been described largely in terms of a single cloud provider, the operating environment and processes can be configured for multiple cloud providers. For example, a third party cloud broker may allocate resources made available by multiple cloud providers to cloud clients using the processes described above. In such implementations, each cloud provider may specify conditions, such as quantity-based conditions and/or ratio-based conditions for its resources. The cloud broker can include a request aggregator that groups requests for each cloud provider based on their respective conditions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a cloud provider server and from one or more cloud client devices of resource requesters, a set of requests for computing resources, each request specifying one or more computing resources and, for each of the one or more computing resources, a quantity of the computing resource requested;
   identifying, by the cloud provider server, a quantity-based provider condition that a request must meet for inclusion in an allocation process that allocates computing resources based on requests for the computing resources;
   including in a proper subset of the requests, each received request that fails to meet the quantity-based provider condition;
   grouping, by the cloud provider server, requests in the proper subset of requests into one or more groups based at least on the quantity of the one or more resources specified by each request of the proper subset and the quantity-based provider condition, each group including one or more requests, and at least one group including requests received from different resource requesters;

generating, by the cloud provider server, a respective combined request for each group of requests, each combined request being a request that meets the quantity-based provider condition;

providing, by the cloud provider server, each combined request and each request of the set of requests that independently meet the quantity-based provider condition as inputs to the allocation process;

receiving, by the cloud provider server, data specifying an allocation of a set of computing resources from the allocation process; and providing, by the cloud provider server, data that causes the set of computing resources to be allocated to resource requesters based on the specified allocation.

2. The method of claim 1, wherein the quantity-based provider condition specifies a particular quantity of resources that must be requested for inclusion in the allocation process, the method further comprising:

identifying two or more requests for which a sum of the quantities of the one or more resources specified by the two or more requests meets the particular quantity of resources; and determining to group the two or more resources in response to the sum meeting the particular quantity of resources.

3. The method of claim 1, wherein the quantity-based provider condition specifies a particular quantity of resources that must be requested for inclusion in the allocation process, the method further comprising:

determining that a sum of the quantities of the one or more resources specified by requests of a particular group is less than the particular quantity of resources; and increasing the quantity specified by each request of the particular group such that a sum of the increased quantities of the one or more resources specified by the group meets the particular quantity specified by the quantity-based provider condition.

4. The method of claim 1, further comprising:

determining that a sum of the quantities of the one or more resources specified by requests of a particular group is less than a particular quantity of resources specified by the quantity-based provider condition;

identifying a quantity of excess resources to be requested in a combined request for the particular group based on a difference between a sum of the quantities and the particular quantity of resources specified by the quantity-based provider condition;

identifying a cost for a compliant request that meets the particular quantity specified by the quantity-based provider condition;

determining a cost for the excess resources based on the cost for the compliant request and the quantity of excess resources to be requested; and dividing the cost for the excess resources between each request included in the particular group.

5. The method of claim 4, wherein dividing the cost of the excess resources between each request included in the particular group comprises:

determining that a first quantity of the one or more computing resources specified by a first request included in the particular group is less than a second quantity of the one or more computing resources specified by a second request included in the particular group; and assigning a greater proportional share of the cost of the excess resources to the first request than the second request in response to determining that the first quantity is less than the second quantity.

6. The method of claim 1, wherein:

the provider condition specifies a preferred ratio between a quantity of a first computing resource and a quantity of a second computing resource included in a request; and grouping the proper subset of requests into one or more groups comprises:

identifying a first request and a second request of the proper subset as candidates for a particular group;

determining a combined ratio between (a) a total quantity of the first resource specified by the first request and the second request; and (b) a total quantity of the second resource specified by the first request and the second request;

determining that the combined ratio is within a threshold amount of the preferred ratio; and determining to group the first and second requests in a particular group together in response to determining that the combined ratio is within a threshold amount of the preferred ratio.

7. The method of claim 1, wherein grouping the proper subset of requests into one or more groups comprises:

identifying a first request and a second request of the proper subset as candidates for a particular group, the first request including a first bid specifying an amount that a first requester is willing to pay for the one or more computing resources specified by the first request, and the second request includes a second bid specifying an amount that a second requester is willing to pay for the one or more computing resources specified by the second request;

determining that the amount of the first bid is within a threshold amount of the amount of the second bid; and determining to group the first and second requests in a particular group together in response to determining that the amount of the first bid is within a threshold amount of the second bid.

8. The method of claim 7, wherein the allocation process comprises an auction that allocates the set of resources based on bid amounts specified by the requests provided as input to the allocation process.

9. The method of claim 8, further comprising determining a bid amount for a combined request for the particular group based on the amounts specified by the first and second bids.

10. The method of claim 1, wherein each request specifies the one or more computing resources in abstract computing units.

11. A system, comprising:

a data store for storing quantity-based provider conditions; and one or more cloud provider servers configured to interact with the data store, the one or more cloud provider servers being further configured to perform operations comprising:

receiving, by the one or more cloud provider servers and from one or more cloud client devices of resource requesters, a set of requests for computing resources, each request specifying one or more computing resources and, for each of the one or more computing resources, a quantity of the computing resource requested;

identifying, by the one or more cloud provider servers, a quantity-based provider condition that a request must meet for inclusion in an allocation process that allocates computing resources based on requests for the computing resources;

including in a proper subset of the requests, each received request that fails to meet the quantity-based provider condition;

grouping, by the one or more cloud provider servers, requests in the proper subset of requests into one or more groups based at least on the quantity of the one or more resources specified by each request of the proper subset and the quantity-based provider condition, each group including one or more requests, and at least one group including requests received from different resource requesters;

generating, by the one or more cloud provider servers, a respective combined request for each group of requests, each combined request being a request that meets the quantity-based provider condition;

providing, by the one or more cloud provider servers, each combined request and each request of the set of requests that independently meet the quantity-based provider condition as inputs to the allocation process;

receiving, by the one or more cloud provider servers, data specifying an allocation of a set of computing resources from the allocation process; and providing, by the one or more cloud provider servers, data that causes the set of computing resources to be allocated to resource requesters based on the specified allocation.

12. The system of claim 11, wherein the quantity-based provider condition specifies a particular quantity of resources that must be requested for inclusion in the allocation process, the method further comprising:
identifying two or more requests for which a sum of the quantities of the one or more resources specified by the two or more requests meets the particular quantity of resources; and
determining to group the two or more resources in response to the sum meeting the particular quantity of resources.

13. The system of claim 11, wherein the quantity-based provider condition specifies a particular quantity of resources that must be requested for inclusion in the allocation process, the method further comprising:
determining that a sum of the quantities of the one or more resources specified by requests of a particular group is less than the particular quantity of resources; and
increasing the quantity specified by each request of the particular group such that a sum of the increased quantities of the one or more resources specified by the group meets the particular quantity specified by the quantity-based provider condition.

14. The system of claim 11, wherein the one or more processors are further configured to perform operations comprising:
determining that a sum of the quantities of the one or more resources specified by requests of a particular group is less than a particular quantity of resources specified by the quantity-based provider condition;
identifying a quantity of excess resources to be requested in a combined request for the particular group based on a difference between a sum of the quantities and the particular quantity of resources specified by the quantity-based provider condition;
identifying a cost for a compliant request that meets the particular quantity specified by the quantity-based provider condition;
determining a cost for the excess resources based on the cost for the compliant request and the quantity of excess resources to be requested; and
dividing the cost for the excess resources between the each request included in the particular group.

15. The system of claim 14, wherein dividing the cost of the excess resources between each request included in the particular group comprises:
determining that a first quantity of the one or more computing resources specified by a first request included in the particular group is less than a second quantity of the one or more computing resources specified by a second request included in the particular group; and
assigning a greater proportional share of the cost of the excess resources to the first request than the second request in response to determining that the first quantity is less than the second quantity.

16. The system of claim 11, wherein:
the provider condition specifies a preferred ratio between a quantity of a first computing resource and a quantity of a second computing resource included in a request; and
grouping the proper subset of requests into one or more groups comprises:
identifying a first request and a second request of the proper subset as candidates for a particular group;
determining a combined ratio between (a) a total quantity of the first resource specified by the first request and the second request; and (b) a total quantity of the second resource specified by the first request and the second request;
determining that the combined ratio is within a threshold amount of the preferred ratio; and
determining to group the first and second requests in a particular group together in response to determining that the combined ratio is within a threshold amount of the preferred ratio.

17. The system of claim 11, wherein grouping the proper subset of requests into one or more groups comprises:
identifying a first request and a second request of the proper subset as candidates for a particular group, the first request including a first bid specifying an amount that a first requester is willing to pay for the one or more computing resources specified by the first request, and the second request includes a second bid specifying an amount that a second requester is willing to pay for the one or more computing resources specified by the second request;
determining that the amount of the first bid is within a threshold amount of the amount of the second bid; and
determining to group the first and second requests in a particular group together in response to determining that the amount of the first bid is within a threshold amount of the second bid.

18. The system of claim 11, wherein the allocation process comprises an auction that allocates the set of resources based on bid amounts specified by the requests provided as input to the allocation process.

19. The system of claim 11, further comprising determining a bid amount for a combined request for the particular group based on the amounts specified by the first and second bids.

20. A non-transitory computer storage medium encoded with a computer program, the program comprising instructions that when executed by a cloud provider server cause the cloud provider server to perform operations comprising:

receiving, by the cloud provider server and from one or more cloud client devices of resource requesters, a set of requests for computing resources, each request specifying one or more computing resources and, for each of the one or more computing resources, a quantity of the computing resource requested;

identifying, by the cloud provider server, a quantity-based provider condition that a request must meet for inclusion in an allocation process that allocates computing resources based on requests for the computing resources;

including in a proper subset of the requests, each received request that fails to meet the quantity-based provider condition;

grouping, by the cloud provider server, requests in the proper subset of requests into one or more groups based at least on the quantity of the one or more resources specified by each request of the proper subset and the quantity-based provider condition, each group including one or more requests, and at least one group including requests received from different resource requesters;

generating, by the cloud provider server, a respective combined request for each group of requests, each combined request being a request that meets the quantity-based provider condition;

providing, by the cloud provider server, each combined request and each request of the set of requests that independently meet the quantity-based provider condition as inputs to the allocation process;

receiving, by the cloud provider server, data specifying an allocation of a set of computing resources from the allocation process; and providing, by the cloud provider server, data that causes the set of computing resources to be allocated to resource requesters based on the specified allocation.

\* \* \* \* \*